(12) United States Patent
Smilanski et al.

(10) Patent No.: US 7,315,697 B2
(45) Date of Patent: Jan. 1, 2008

(54) LIGHT SOURCE FOR GENERATING AN OUTPUT SIGNAL HAVING SPACED APART FREQUENCIES

(75) Inventors: Israel Smilanski, Rockville, MD (US); Isaac Shpantzer, Bethesda, MD (US); Jacob B. Khurgin, Baltimore, MD (US); Nadejda Reingand, Baltimore, MD (US); Pak Shing Cho, Gaithersburg, MD (US); Yaakov Achiam, Rockville, MD (US)

(73) Assignee: CeLight, Inc., Silver Spring, MD (US)

( * ) Notice: Subject to any disclaimer, the term of this patent is extended or adjusted under 35 U.S.C. 154(b) by 1076 days.

(21) Appl. No.: 10/173,579

(22) Filed: Jun. 18, 2002

(65) Prior Publication Data

US 2002/0196509 A1 Dec. 26, 2002

Related U.S. Application Data

(63) Continuation-in-part of application No. 09/962,243, filed on Sep. 26, 2001.

(60) Provisional application No. 60/234,930, filed on Sep. 26, 2000.

(51) Int. Cl.
*H04J 14/02* (2006.01)
*H04B 10/04* (2006.01)

(52) U.S. Cl. ............... 398/201; 398/87; 398/183; 398/193; 398/200

(58) Field of Classification Search ............ 398/87, 398/182, 183, 193, 200, 201; 372/12, 23, 372/26, 29.013
See application file for complete search history.

(56) References Cited

U.S. PATENT DOCUMENTS 3,521,069 A 7/1970 De Maria et al.
3,575,670 A 4/1971 Hansen (Continued)

OTHER PUBLICATIONS

R. Brinkman et al.; "Erbium-doped Single and Double-Pass Ti:LiNbO3 Waveguide Amplifiers", IEEE J. of Quantum Electronics, 1994, v. 30, #10, pp. 2356-2360.

(Continued)

*Primary Examiner*—Dalzid Singh
(74) *Attorney, Agent, or Firm*—Nadejda Reingand

(57) ABSTRACT

A multiple wavelength light source generates an output signal having a comb of accurately spaced apart frequencies with variable free spectral range in the C-band of optical fiber communication. The light source employs an electro-optical modulator (EOM) driven by a signal generator which modulates with EOM with multiple modulation frequencies to widen the output spectrum of signal. The EOM has a crystal provided with a waveguide. The waveguide may be doped with a rare-earth metal to impart gain properties to equalize the intensities of the comb. In one preferred embodiment, Er, Yt or other doping elements provide the gain property to waveguides. The crystal is also provided with periodically poled structure, and this may be engineered so as to form domains of unequal widths to improve the efficiency of modulation. The output signal from the light source may be split and presented to a bank of filters to create a multiple signals, each signal having one of the spaced apart frequencies. The output signals may be used as channels to be modulated by data and then combined in dense wavelength division multiplexing system, or may be used as a soliton source in time-division multiplexed communication systems.

44 Claims, 11 Drawing Sheets

U.S. PATENT DOCUMENTS

| | | | | |
|---|---|---|---|---|
| 3,613,028 | A | | 10/1971 | Saidel |
| 4,839,614 | A | | 6/1989 | Hill et al. .................. 332/7.51 |
| 4,861,136 | A | | 8/1989 | Stone et al. ............... 350/96.3 |
| 4,989,201 | A | | 1/1991 | Glance .......................... 270/3 |
| 5,463,647 | A | * | 10/1995 | Pan ............................. 372/12 |
| 5,473,722 | A | | 12/1995 | Sohler et al. ............... 385/132 |
| 5,732,177 | A | * | 3/1998 | Deacon et al. .............. 385/122 |
| 5,768,302 | A | * | 6/1998 | Wallace et al. ............... 372/21 |
| 5,796,764 | A | | 8/1998 | Corsini |
| 5,835,199 | A | | 11/1998 | Phillips et al. |
| 6,115,122 | A | | 9/2000 | Bao et al. .................... 356/345 |
| 6,201,638 | B1 | * | 3/2001 | Hall et al. .................. 359/346 |
| 6,289,032 | B1 | | 9/2001 | Fay et al. .................. 372/102 |
| 7,010,231 | B1 | * | 3/2006 | Franco et al. ............... 398/148 |

OTHER PUBLICATIONS

H. Suche et al. "Integrated Optical TiEr: LiNbo3 Soliton Source", IEEE J. of Quantum Electronics, 1997, v. 33, #10, pp. 1642-1645.

A.Yariv, Optical electronics in modern communications, 5-th edition, Oxford University Press, 1997.

Y.Lu, M.Xao, G.J.Salamo Wide-bandwidth high-frequency electro-optic modulator based on periodically poled LiNbO3 , Appl. Phys. Lett., 2001, v.78 #8, pp. 1035-1037.

J.B.Khurgin, J.U.Kang, Y.J.Ding Ultrabroad-bandwidth electro-optic modulator based on cascaded Bragg grating, Optics Lett. 2000. v.25, #1, pp. 70-72.

B.E.A.Saleh, M.C.Teich, Fundamentals of photonics, 1991, John Wiley & Sons, Inc., p. 76.

M.Fejer et al. Quasi-Phase-Matched Second Harmonic Generation: Tuning and Tolerances, IEEE J.of Quantum Electronics, 1992, v.28, #11, p. 2631-2654.

L.R.Brothers et al.Dispersion compensation for terahertz optical frequency comb generation, Opt.Lett. 1997, v.22, #13, pp. 1015-1017.

O.P.Gough et al. "Zero frequency error DWDW channel synthesis using optical injection-locked comb line selection". Electr. Lett., 1999, 35, #23, pp. 2050-2052.

C.F.Silva et al."Exact optical frequency synthesis over >1THz using SG-DFB lasers".

H.Murata et al. "Optical pulse generation by electro-modulation method and its application to integrated ultrashort pulse generators", IEEE J.on Sel. Topics in Quant.Electr., 2000, v.6,#4, 1325-1331.

M. Kourogi; "Optical Frequency Comb Generators and their Applications", Frequency Control of Semiconductor Lasers, Chapter 4, Edited by Motoichi Ohtsu; © 1996 John Wiley &n Sons, Inc.

A.S. Bell, et al., "Efficient Optical Frequency-Comb Generator"; Optics Letters; Optical Society of America; Jun. 15, 1995; vol. 20, No. 12; pp. 1435-1437.

M. Bellini et al.; Phase-Locked White-Light Continuum Pulses: Toward a Universal Optical Frequency-Comb Synthesizer; Jul. 15, 2000; vol. 25, No. 14; Optics Letters; Optical Society of America; p. 1049-1051.

S.A. Diddams, et al.; "Broadband Optical Frequency Comb Generation With A Phase-Modulated Parametric Oscillator"; Dec. 1, 1999; vol. 24, No. 23; Optic Letters; Optical Society of America; pp. 1747-1749.

R. Holzwarth, et al.; White-light frequency Comb Generation with a Diode-pumped Cr:LiSAF Laser; Sep. 1, 2000; vol. 26; No. 17, Optics Letters; Optical Society of America pp. 1376-1378.

M. Kourogi et al. "A Monolithic Optical Frequency Comb Generator"; 1994 IEEE; Photonics Technology Letters vol. 6, No. 2; pp. 214-217.

K. Imai, et al.; "30-THz Span Optical Frequency Comb Generation by Self-Phase Modulation in an Optical Fiber"; 1998; IEEE; Journal of Quantum Electronics, vol. 34; No. 1; pp. 54-60.

J.B. Khurgin et al.; "Ultrabroad-bandwidth electro-optic modulator based on a cascaded Bragg Grating"; Jan. 1, 2000; vol. 25; No. 1 Optics Letters; Optical Society of America; pp. 70-72.

M. Kourogi et al.; "Limit of Optical-Frequency Comb Generation Due to Material Dispersion"; IEEE; Journal of Quantum Electronics, vol. 31, No. 12, 1995; pp. 2120-2136.

* cited by examiner

LIGHT SOURCE FOR GENERATING AN OUTPUT SIGNAL HAVING SPACED APART FREQUENCIES

RELATED APPLICATIONS

This is a continuation-in-part of U.S. patent application Ser. No. 09/962,243 filed Sep. 26, 2001, which itself claims priority to U.S. Provisional Patent Application No. 60/234,930 filed on Sep. 26, 2000. This application is related to application Ser. No. 10/173,581, titled METHOD AND SYSTEM FOR ACOUSTICALLY TUNING A LIGHT SOURCE, filed even date herewith, invented by Jacob B. Khurgin, Nadejda Reingand, Isaac Shpantzer, Israel Smilanski, and Pak Shing Cho.

FIELD OF INVENTION

The present invention relates to a multiple wavelength light source that generates an optical signal having a number N discrete evenly spaced-apart frequencies, $f_1, f_2, \ldots, f_N$ wherein for all frequencies $2 \leq i \leq N$, $f_i - f_{i-1} = \Omega$, wherein $\Omega$ is a constant frequency spacing. It also relates to a light source that outputs a number N optical signals, each optical signal having one of these frequencies.

BACKGROUND OF INVENTION

It is well known that the intensity, phase or spectrum of light can be controlled when an electric field is applied to an electro-optical crystal through which light propagates. (See, e.g., for example, A. Yariv, Optical electronics in modem communications, 5-th edition, Oxford University Press, 1997).

When such an electric field is provided with a modulation frequency, the output signal from the electro-optic crystal has an output frequency that comprises a set of equidistant spectral lines centered around the input frequency of the light. Therefore, modulation with a signal having a plurality of modulation frequencies will cause the output spectrum to contain a plurality of sets of frequencies.

FIG. 1 shows typical output spectrum of an output signal from an EOM (electro-optical modulator). The spectral line corresponding to the base, or central, frequency of the light signal has the highest intensity and the spectral lines 104, 106 on either side are lower, their intensities tapering with their distance from the central frequency 102, thereby giving an envelope 108 of intensities which rises and then falls, as a function of frequency. The rapid fall of the intensity for the spectral lines away from the input (central) frequency does not allow for the creation of a wide comb of frequencies having substantially same intensities, when just an EOM is used.

The prior art also discloses that electro-optical crystals, and in particular waveguides in electro-optical crystals, can be doped by elements which, upon pumping, produce a gain, thereby amplifying light radiation transmitted through the waveguide. U.S. Pat. No. 5,473,722, entitled "Rare-earth-doped Lithium Niobate Waveguide Structures" discloses amplifiers based on Ti:LiNbO$_3$ waveguides doped with Erbium. This is one way to make light amplifiers and lasers.

FIG. 2 shows the comb for an Er-doped LiNbO$_3$ mode-locked laser. As seen in this figure, the output spectrum of a mode-locked laser represents a comb of equally spaced frequencies. However, the spectral lines in the comb collectively form an envelope 202 that rises and falls with frequency. As also seen in this figure, the width of the comb envelope is less than 100 GHz, and therefore covers only a very small part of the 4 THz C-band range.

It is known, however, that operation of a mode-locked laser at a pumping power level lower than the lasing threshold prevents laser oscillation. Under sub-lasing pumping power conditions, a mode-locked laser operates as a modulator/amplifier. The exact gain distribution depends on such factors as the doping type, the doping level, and the pumping level. Rare-earth-doped waveguides are pumped by irradiation with wavelengths below the C-band to generate radiation at wavelengths in the C-band. Optical pumping of an erbium-doped waveguide can provide spontaneous radiation covering the entire C-band. The EO modulation enhances radiation from a portion of this band, and converts some of the energy in the highest gain wavelength into sidebands in the other frequencies. In this case the output spectrum represents a comb of frequencies spaced by the Free Spectral Range (FSR) determined by the EO modulator. The bandwidth of the output spectrum of a mode-locked laser operating at a sub-lasing threshold is therefore much wider than the output spectrum of a mode-locked laser operating above the lasing threshold.

FIG. 3 represents the output spectrum of an EO modulator operating below lasing threshold. The total bandwidth of output spectrum is about 800 GHz, and since the FSR (free spectral range) is 10 GHz, the total number of "teeth" in the comb is about 80. A comparison between FIGS. 2 and 3 shows that the output spectrum is wider when the gain medium in the modulator is operated below the lasing threshold (FIG. 3) than when the gain medium is pumped above lasing threshold in a mode-locked laser (FIG. 2).

Further spreading of the output spectrum is limited mostly by waveguide dispersion that leads to a velocity mismatch between the applied RF signal and the optical wave. One way to address the problem of waveguide dispersion is to introduce compensating dispersive elements inside the cavity, such as prisms or diffraction gratings of dielectric mirrors. Such an approach is described in L. R. Brothers et al. "Dispersion compensation for terahertz optical frequency comb generation", Opt.Lett., 1997, v.22, no.13, pp.1015-1017.

It is also known in the prior art that one may create a variety of periodic structures in the crystal of an electro-optical modulator. One of the known techniques is a periodic poling (PP) in electro-optical crystals like in LiNbO3, LiTaO3, KTP or poled nonlinear polymer materials. This technique involves periodically inverting the crystal structure or domain on a micrometer scale. This is done in, e.g, PPLN (periodically poled LiNbO$_3$) crystals produced by e.g., HCPhotonics, of Hsinchu, Taiwan.

A mode-locked laser may include an electro-optic modulator configured to modulate the refractive index of the laser cavity. For example, an integrated mode-locked laser comprising an electro-optically modulated Er-doped Ti:LiNbO3 waveguide is disclosed in H. Suche et al. "Integrated Optical Ti:Er:LiNbo3 Soliton Source", IEEE J. of Quantum Electronics, 1997, v.33, no.10, pp.1642-1645. The output signal represents a series of short pulses in the time domain, or a comb of frequencies in frequency domain. The modulation frequency determines the FSR of the laser's output spectrum. The FSR is the frequency spacing between the "teeth" of the comb.

The prior art includes optical communication systems that incorporate light sources that output optical signals having evenly spaced frequencies. U.S. Pat. No. 4,989,201, entitled "Optical Communication System With a Stabilized "Comb" of Frequencies" is one such example.

SUMMARY OF THE INVENTION

It is an object of the present invention to create a multi-wavelength light source which outputs a light signal having a plurality of discrete wavelengths that are phase coherent and evenly spaced apart in frequency with the light at each wavelength having substantially the same intensity.

One embodiment of the invention relates to a multi-frequency light source comprising at least one laser configured to output a first light signal having a first frequency and an electro-optical modulator (EOM) 408 comprising (1) a waveguide having a first and a second end, the waveguide extending along a light propagation dimension; and (2) a signal generator configured to apply a modulation signal to drive the EOM. A first mirror may be positioned in an optical path between the at least one laser and the first end of the waveguide, and a second mirror positioned at the second end of the waveguide. The waveguide preferably includes a plurality of alternately poled optical domains, each optical domain having a width defined along the light propagation dimension, the plurality of optical domains collectively having a periodic width structure. The first and second mirrors may be resonant mirrors.

In one aspect of the invention, a crystal comprises the waveguide. The crystal may be formed from lithium niobate ($LiNbO_3$) and the waveguide formed by doping the crystal with, e.g., titanium, The titanium may be diffused into the lithium niobate to realize the doping.

In another aspect of the invention, the titanium-doped waveguide may be doped with a rare-earth metal, such as erbium or yttrium. This provides gain and, preferably, resonance when the waveguide is pumped.

In yet another aspect of the invention, the signal generator applies a plurality of spaced apart frequencies to the EOM.

In yet another aspect of the invention, the crystal structure is engineered to have a periodicity of two with domains of alternating, unequal width.

In yet another aspect of the invention, the crystal structure is engineered to have a periodicity higher than two, preferably comprising a plurality of units of domains each having a width. In a preferred embodiment, the crystal structure comprises repeated units of at least three domains. Within a given unit, each domain may have a different width.

The present invention is also directed to an optical communication system employing a light source in accordance with the present invention. Such communication systems can include a wide division multiplexed (WDM) and a time division multiplexed (TDM) optical communication system.

BRIEF DESCRIPTION OF THE DRAWINGS

The present invention is now described with reference to the accompanying drawings in which.

DETAILED DESCRIPTION OF THE PREFERRED EMBODIMENT

Figure 1:
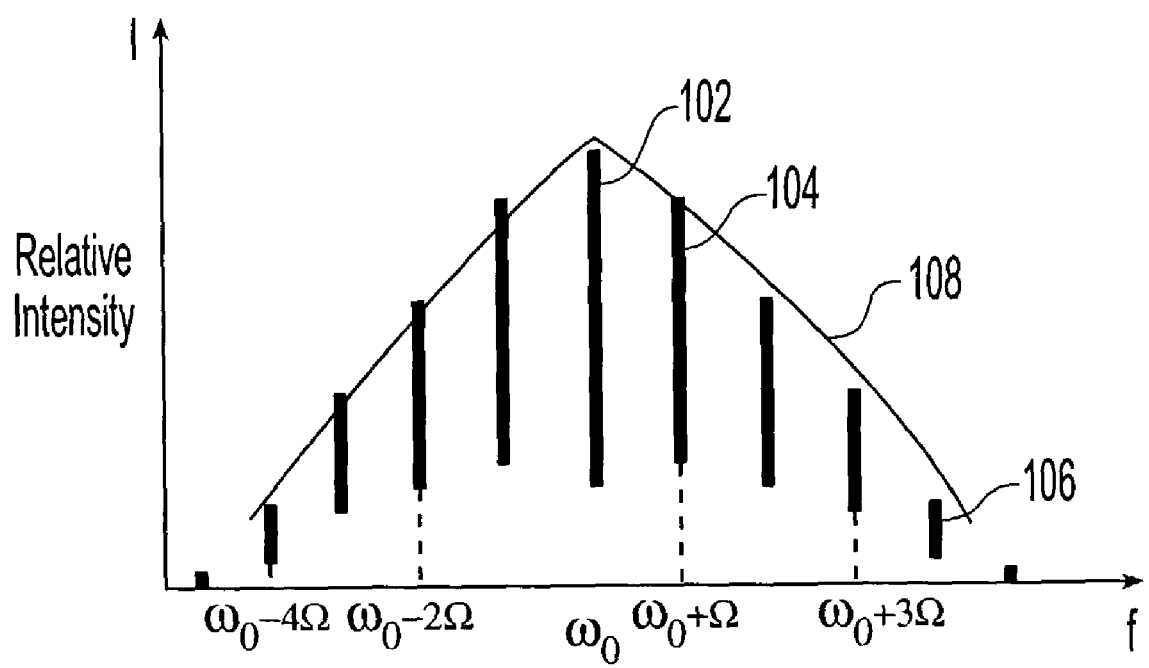
FIG. 1 is a typical spectral envelope for a conventional electro-optic modulator.
Figure 2:
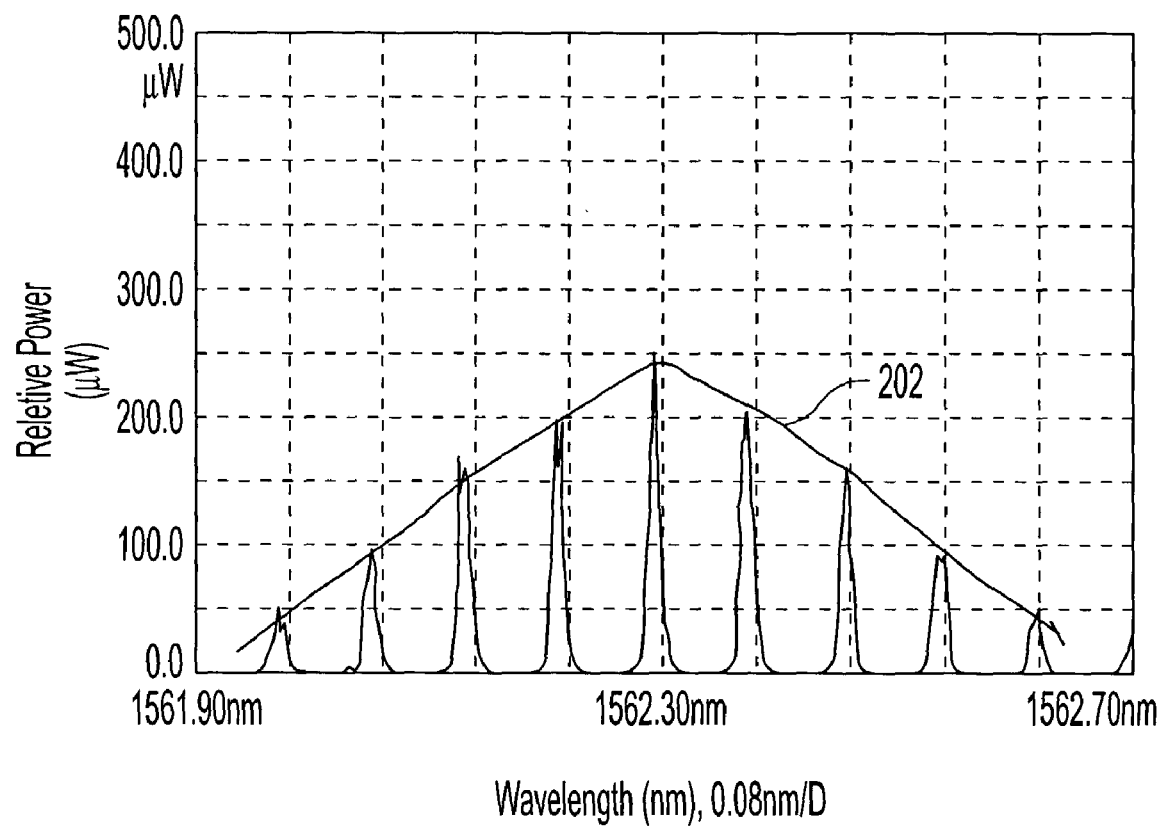
FIG. 2 shows a spectral envelope for a conventional Er-doped mode locked laser.
Figure 3:
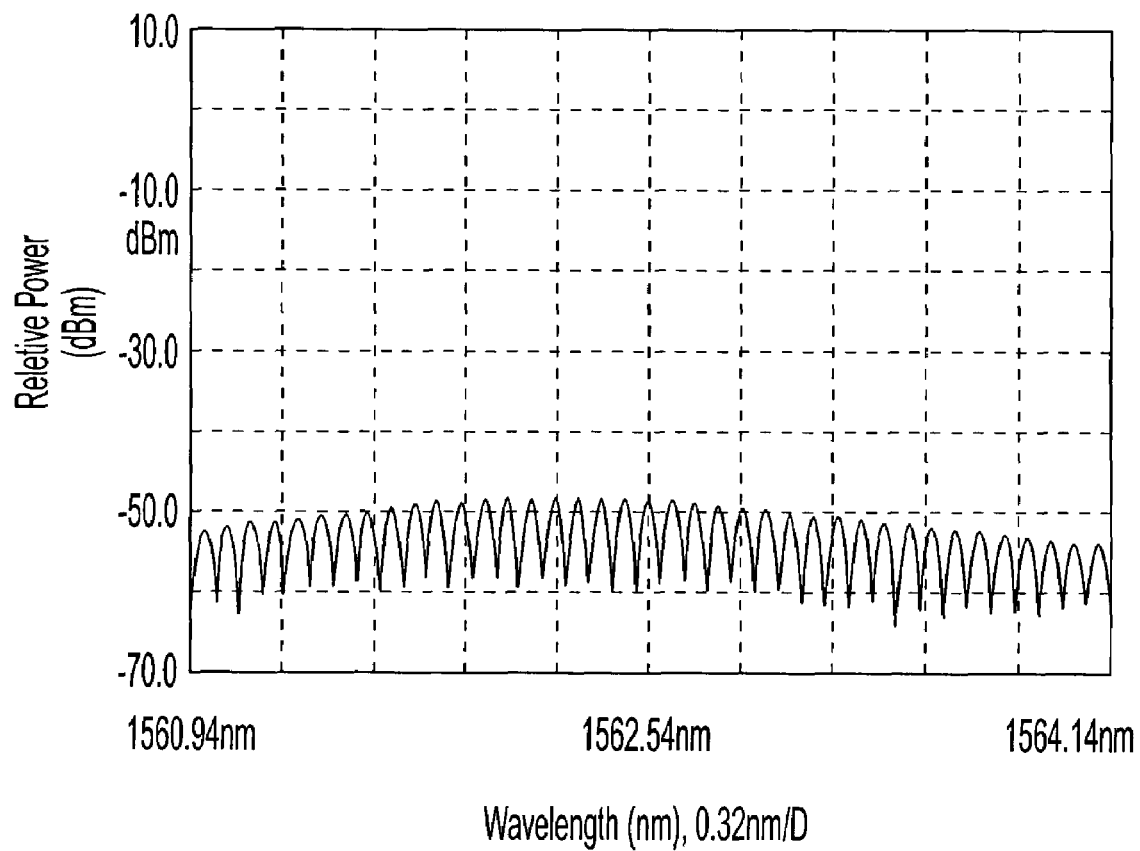
FIG. 3 shows a spectral envelope for a conventional modulator driven below the lasing threshold.
Figure 4:
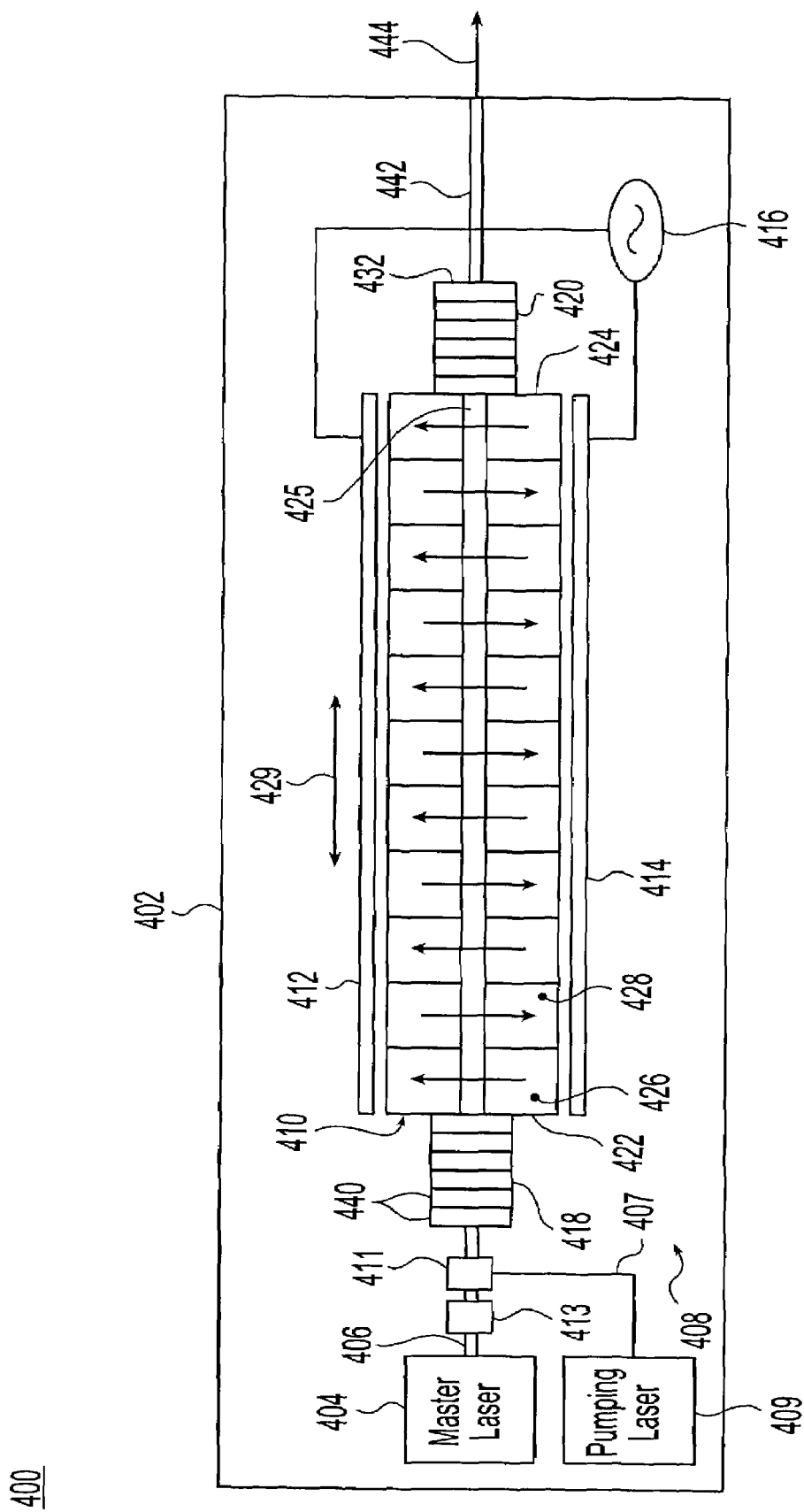
FIG. 4 shows a light source in accordance with present invention.

FIG. 4 shows a light source 400 in accordance with the present invention. The light source 400 may include a housing 402 and a number of individual components, such as a master laser 404, a pump laser 409, and an electro-optic waveguide modulator (EOM). In the embodiment of FIG. 4, the master laser 404 and pump laser 409 are shown to be enclosed within housing 402. It is understood, however, that these lasers may likewise be disposed outside the housing and optically coupled to other components by a suitable fiber, waveguide, or the like.

The master laser 404 generates a high-fidelity optical signal 406 preferably having a frequency $f_0$ located within the C-band (191.6-195.9 THz). In a preferred embodiment, the master laser 404 may be obtained from Fiberspace, Inc, of Woodland Hills, Calif., with an optical phase-locked loop to produce highly stable laser radiation with long-term frequency stability within a range of 5 MHz.

The pump source 409 generates pump light having a wavelength suitable for pumping a gain medium of the electro-optic waveguide modulator, as discussed below. Preferred pump sources include diode lasers emitting infrared light, such as laser light having a wavelength of about 980 nanometers or about 1480 nanometers. One suitable pump laser is a model FOL 1402 diode laser available from Fitel of Clinton, N.J.

The optical signal 406 output by master laser 404 and the pump light output by the pump laser 409 are input to an electro-optic modulator (EOM) assembly 408. A waveguide 425 of the EOM assembly preferably receives pump light and the optical signal output by the master laser 404. The EOM assembly 408 of the present invention comprises the electro-optic waveguide modulator, which may be disposed on a crystal 410 (EOM crystal) that is sandwiched between first 412 and second 414 electrodes. A signal generator 416 is configured to drive the electrodes 412, 414 with a modulation signal to modulate the refractive index of the EO crystal.

As seen in FIG. 4, optical signal 406 and pump light 407 may be combined prior to entering crystal 410, such as by a fiber coupler 411 disposed externally to crystal 410. Alternatively, however, optical signal 406 and pump light 407 may be combined subsequent to entering the electro-optic waveguide modulator. A wavelength division multiplexer disposed within the modulator may be used to combine the master laser signal and pump light in such embodiments.

The light source 400 may include an optical element, such as an isolator 413, disposed along the optical path between the master laser 404 and the electro-optic waveguide modulator and configured to reduce the tendency of optical signal 406 to be received as feedback by the master laser 404.

Suitable isolators include single stage polarization insensitive fiber isolators available from JDS Uniphase of Ottawa, Calif.

The first and second ends 422, 424 of the EOM crystal preferably are polished to help minimize distortion of an optical signal passing into and out of each of the two ends. First and second mirrors 418, 420, which are preferably multi-layer mirrors as shown, are positioned at respective ends of the EOM crystal 410. Thus, the first mirror 418 is positioned in an optical path between the master laser 404 and the first end 422 of the EOM crystal 414 while the second mirror 420 is positioned at the second end 424 of the EOM crystal 414. Each mirror 418, 420 may be spaced apart from its corresponding EOM crystal end. Alternatively, each mirror may simply abut its corresponding end, or even be adhesively fixed thereto.

It should be understood that the optical signal 406 and pump light 407 may be received by either the first or second end 422, 424 of the EOM crystal 410. Additionally, the optical signal 406 and pump light 407 may be received by different ends of the EOM crystal 410. In one embodiment, for example, a light source is configured so that the electro-optic modulator emits an optical comb via the same end that receives the optical signal from a master laser. In such a light source, an optical element, such as a circulator, may be placed along the optical path between the master laser and electro-optic modulator to both reduce the amount light from the comb that enters the cavity of the master laser and split the optical comb from the optical signal of the master laser. Suitable circulators include polarization-insensitive fiberoptic circulators available from JDS Uniphase of Ottawa, Calif.

Returning to the embodiment of FIG. 4, the EOM crystal 410 has waveguide 425 formed therein. The waveguide 425 extends between first 422 and second 424 ends of the EOM crystal, along a light propagation dimension, shown generally by arrow 429. In a preferred embodiment, the EOM crystal is formed from lithium niobate ($LiNbO_3$). The waveguide 425 may be formed by diffusing titanium into the crystal. Prior to diffusion, a suitable titanium layer is formed on the EOM crystal by techniques such as sputtering, chemical vapor deposition, or ion exchange technology, among others. The geometry of the waveguide is determined using known photolithographic methods. It should be noted here, however, that while titanium is preferred, materials other than titanium may instead be used to form the waveguide.

In addition, the waveguide 425, regardless of how it is formed, preferably is doped with a gain medium to form an amplifying waveguide having an optical gain. For an EOM crystal formed from $LiNbO_3$ with a titanium waveguide, this doping may be performed using a rare-earth metal, such as erbium, yttrium, or the like, for C-band operation. U.S. Pat. No. 5,227,913 to McCaughem et al., whose contents are incorporated by reference to the extent necessary to understand the present invention, discloses a suitable method to form a rare-earth doped titanium waveguide by co-doping erbium and titanium into lithium niobate.

First and second mirrors 418, 420 preferably define an optical cavity such that light may oscillate or resonate within the optical cavity. Wherein the waveguide 425 comprises a gain medium, light generated by the gain medium may resonate within the cavity, thereby experiencing optical gain.

The waveguide 425 and, preferably, the EOM crystal 410 may be provided with a plurality of alternately poled optical domains, designated 426 and 428 in FIG. 4, each optical domain having a width defined along the light propagation dimension 429 and the plurality of optical domains collectively having a periodic width structure. Light propagating along a waveguide having optical domains in accordance with the invention preferably passes through the various optical domains. Preferred domains induce a phase shift of light passing between adjacent domains, which may have widths of from about 300 to about 2000 times the wavelength of optical signal 406. For example, for optical signals in the C band, domain widths may have a minimum width of, for example, about 0.5 millimeters; the domain widths may have a maximum of, for example, about 3.0 millimeters.

The first mirror 418 is preferably a resonant mirror and comprises a plurality of reflecting layers 440 of dielectric material. Nominally, 15-25 layers are present, although a larger or smaller number of layers may be used, instead. Preferably, the number of layers in the first resonant mirror is sufficient to provide a reflectivity of 99% or greater. Preferably, the layers alternate between a first and a second type of material having first and second indices of refraction $n_1$, $n_2$, respectively. The indices of refraction $n_1$, $n_2$ of the two materials preferably fall on either side an index of refraction no of the waveguide 425. In a preferred embodiment, the first type of material with index of refraction $n_0$ may be one or more from the group consisting of $TiO_2$, $Ta_2O_5$, $Nb_2O_5$, and the second type of material with index of refraction $n_2$ may be SiO2.

The thickness of each layer of material in the first mirror nominally ranges between 0.30-0.60 μm, although other thicknesses are possible. In general, the thickness of the each layer is about one-quarter the operating wavelength of the light from the master laser. The total thickness of a dielectric mirror, which is related to the number of layers (and their corresponding widths), is determined by the required reflectivity at the wavelength of interest to generate harmonics for the resulting output signal. The required reflectivity, which typically is at least 80% and more preferably is at least 85%, is, in turn, related to the amount of gain—the more the layers, the more the gain. However, the gain (and thus the number of layers) should not be arbitrarily large because the device is preferably driven below the lasing threshold.

The second mirror 420 preferably is also a resonant mirror comprising a number of layers, and a reflectivity of at least 80%, and more preferably 85%. The layers of the second dielectric mirror also are formed from alternating materials of two types, much like the layers in the first mirror 418.

In FIG. 4, the thickness of each layer in mirrors 418 and 420 is shown to be the same. Preferably, however, the layer thickness in at least one of the two mirrors changes gradually with distance. More preferably, the thickness of the layers monotonically increases with distance from the crystal 410. The term "monotonically" includes embodiments where, for example, the layer thicknesses increase non-linearly with distance from crystal 410.

Figure 4A:
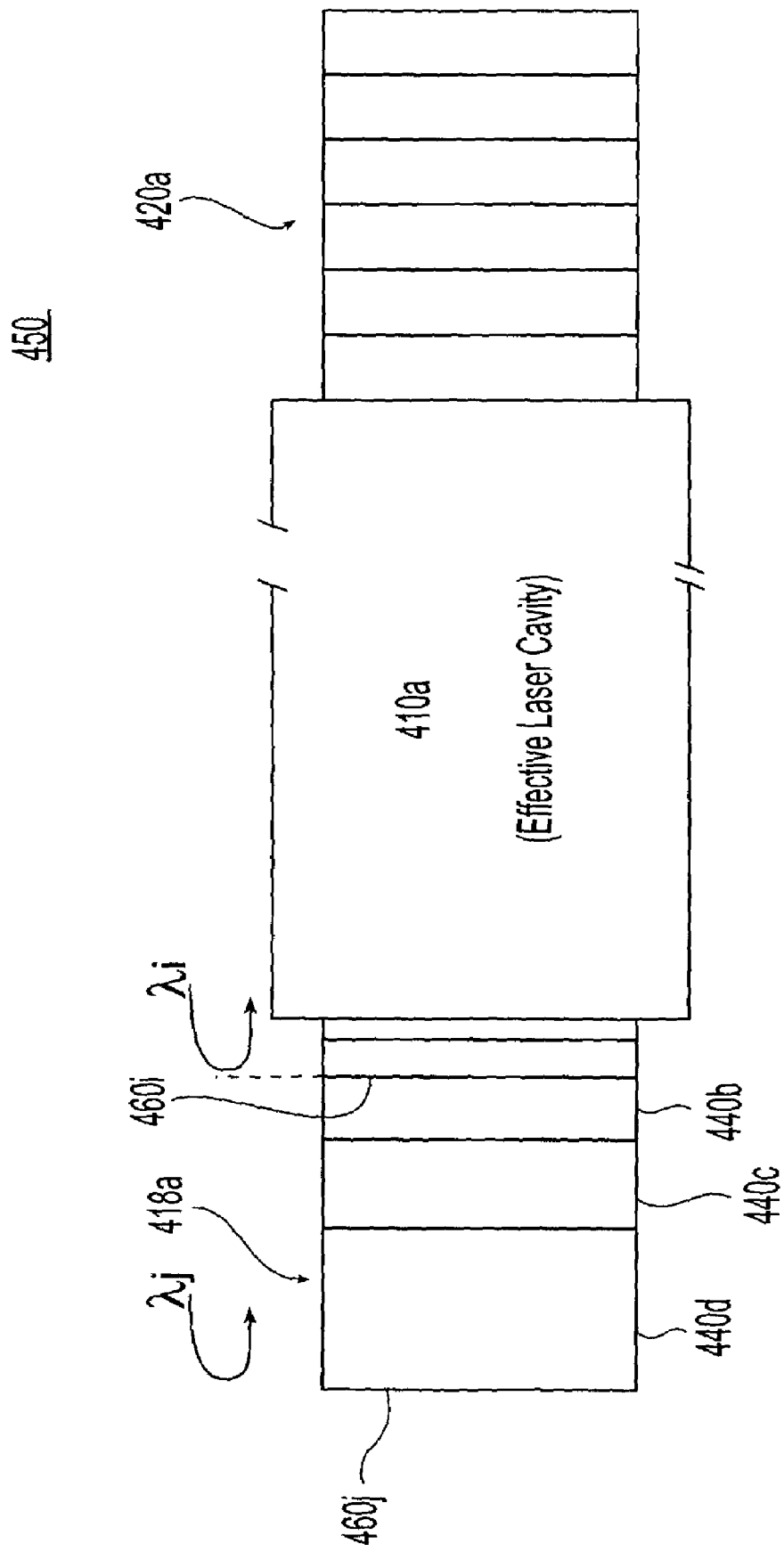
FIG. 4a shows an EO modulator in combination with a first embodiment of the mirror structure.

FIG. 4a shows an alternative embodiment of an optical modulator sub-assembly 450 comprising a crystal 410a and mirrors 418a and 420a. Mirror 418a is seen to be chirped, while mirror 420a is not. In chirped mirror 418a, the thickness of the layers increases with distance from the crystal 410a, layer 440c being thicker than layer 440b, and layer 440d being thicker than layer 440c. Preferably, the layer thickness in mirror 418a increases monotonically. More preferably, the layer thickness changes linearly, with the difference in thickness between layers 440d and 440c being the same as the thickness between layers 440c and 440b. Mirror 420a preferably has layers of equal thickness.

In optical modulator sub-assembly 450, only mirror 418a, which is on the laser-side of the crystal 410a, is shown as being chirped. It is understood, however, that the present invention also contemplates (a) neither mirror being chirped; (b) only the mirror away from the laser-side of the crystal 410a being chirped; and (c) both mirrors being chirped with the thickness of layers in both mirrors increasing with distance from the crystal. When both mirrors are chirped, the chirp rate, i.e., the difference in thickness layers, may not be the same.

The chirped dielectric mirror preferably mitigates dispersion problems. This is achieved by providing different "effective length" optical cavities for different wavelengths generated by the device. For example, while a first layer boundary 460i helps define a first effective cavity length suitable for a first wavelength $\lambda_i$, a second layer boundary 460j helps define a second effective cavity length suitable for a second wavelength $\lambda_j$. Thus, a first cavity of optical modulator sub-assembly 450 may support oscillation of light having a first wavelength $\lambda_i$, while a second cavity may support oscillation of light having a second, different wavelength $\lambda_j$. Preferably, light having, for example, a wavelength $\lambda_i$, will oscillate more efficiently in a cavity that supports oscillation of the $i^{th}$ wavelength than in a cavity that supports oscillation of another wavelength. Because the layer boundary 460j is disposed at a greater distance than layer boundary 460i from waveguide 425, the extent of the first cavity along the propagation dimension is less than that of the second cavity. Thus, at least a portion and preferably all of the first cavity resides within the second cavity along the propagation dimension. Of course, an optical device in accordance with the present invention may include more than two effective optical cavities.

To effectively generate different wavelengths within the C-band, the difference between cavity lengths for the shortest wavelength and the longest wavelength is on the order of several micrometers. Thus, the chirped dielectric mirror 418a comprises a plurality of layers of increasing thicknesses, each layer helping define a different effective cavity length that is efficient for a particular wavelength. Furthermore, the set of layers operating with shorter wavelengths is preferably located closer to EO crystal than the sets of layers operating with longer wavelengths.

The first and second mirrors 418, 420 are preferably formed by alternately depositing individual layers of the first type and the second type of material, one at a time, on the ends of the EOM crystal 410, preferably after the waveguide 425 has been formed in the EOM crystal 410. Alternatively, the first and second mirrors 418, 420 may be formed on a transparent substrate and then affixed to the EOM crystal 410 in a known manner. In either case, the cross-sectional surface area of the mirrors 418, 420 may be coextensive with the ends 422, 424 of the EO crystal 410, or may be somewhat smaller than the ends 422, 424, as shown in FIG. 4.

Returning to FIG. 4, the signal generator 416 applies a modulating signal to the electrodes 412, 414 to modulate the light beam 406 from the master laser 404. In a preferred embodiment, the signal generator 416 outputs a modulation signal comprising a fundamental driving frequency $\Omega$ along with at least one or more frequencies, preferably harmonics of the fundamental driving frequency. Thus, a preferred modulation signal is a multi-frequency modulation signal. The value of $\Omega$ determines the spacing between the spectral lines in the comb of optical frequencies $f_1, f_2, \ldots, f_N$ where for all frequencies $2 \leq i \leq N$, $f_i - f_{i-1} = \Omega$ and at least one of $f_i = f_0$, the output signal 406 from the master laser. Preferably, $\Omega$ is between 5 GHz-50 GHz and at least two harmonics of the fundamental driving frequency $\Omega$ are output by the signal generator 416, as discussed further below.

Due to the reflectivities of the two mirrors, the light beam 406 from the master laser 404 experiences oscillation and is further modulated to thereby produce a signal having multiple, evenly-spaced apart spectral lines. Waveguides of preferred optical devices in accordance with the invention, are doped with a gain medium that provides for resonance of the oscillating light. For example, as discussed above, waveguide 425 is doped with a gain medium, Thus, light oscillating waveguide along 425 may also experience resonance. The principle behind the resonance, modulation and subsequent formation of multiple spectral lines having substantially the same intensities is discussed below.

The light signal exiting the back side 432 of the second mirror 420 contains the comb of frequencies spaced apart from one another by $\Omega$ and having substantially the same intensity. This signal may pass through a fiber 442 before it exits the light source as the final multi-line frequency output signal 444 output by the light source 400.

As discussed above, the final output 444 of the light source 400 is a single signal having multiple, evenly spaced apart frequency components, all at substantially the same intensity. One may obtain separate signals, each having one of these frequency components by splitting the final output signal 444 and then filtering each split copy with a band pass filter centered around a desired frequency. Thus, the final output signal 444 can be directed into a 1:K directional coupler/splitter to produce K identical signal lines, and each of these can be subject to an optical filter attuned to passing only one of the several frequencies. This produces a family of separate signals of substantially same intensity, each signal having a single frequency, and the family collectively having multiple, evenly spaced frequencies. In a preferred embodiment, the output signal 444 is split into K channels by a wavelength demultiplexer DEMUX with a channel spacing of $\Omega$.

Figure 5A:
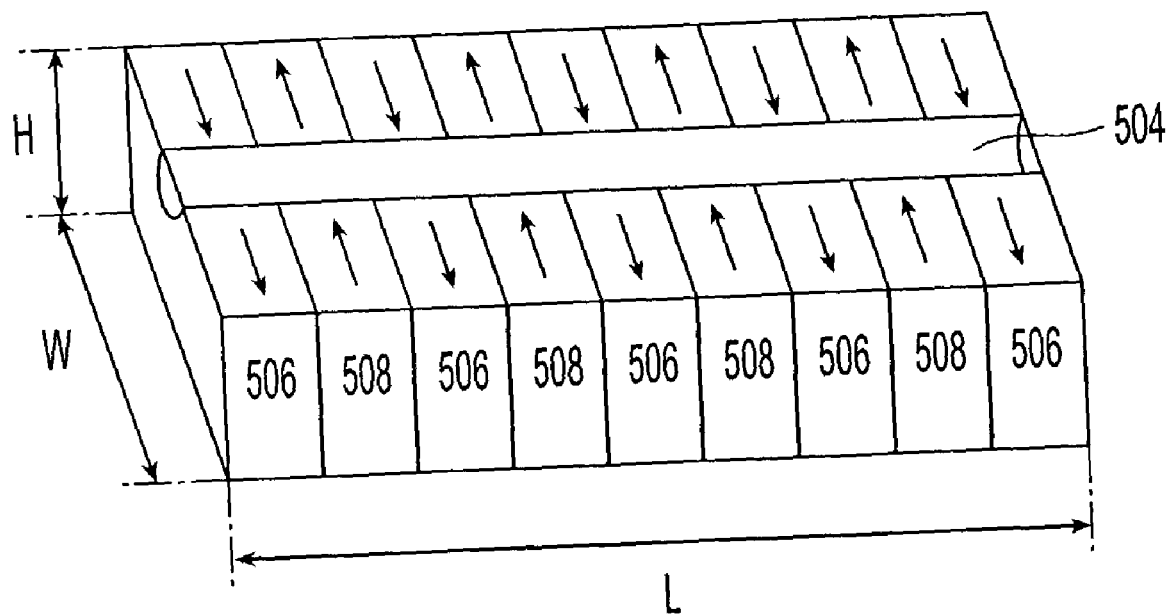
FIGS. 5a-5d show examples of periodically poled EO crystal structures.

FIG. 5a shows a perspective view of a representative EOM crystal 502 of the sort employed in the present invention. Crystal 502 includes a waveguide 504. As discussed above, the EOM crystal 502 is preferably formed from lithium niobate. The EOM crystal 502 preferably is of a rectangular three-dimensional shape having a height H, a width W and a length L. In a preferred embodiment, the height H is between about 0.5 and about 3.0 mm, the width W is between about 0.3 about 1.5 cm and the length L, which extends along the light propagation dimension, is between about 2 and about 8 cm. For reasons of robustness and strength, the crystal itself may be formed on a substrate of a dielectric or other material that has no optical effect on the light signal.

The waveguide 504 and crystal 502 comprises multiple poled domains, designated with domains having a first polarity 506 and a second polarity 508. Manufacture of poled lithium niobate crystals is known to those skilled in the art, as evidenced by Y. Lu et al. "Wide-Bandwidth High-Frequency electro-optic modulator based on periodically poled $LiNbO_3$", Applied Physics Letters, 2001 v.78, no.8, pp.1035-1037. While FIG. 5a only shows a handful of distinct domains, it is understood that, in general, many such domains are present, each domain having a width on the order of about 1000 to about 4000 microns. Thus, for a crystal of length L=5 cm, there may be anywhere from about 12 to about 50 such domains.

Figure 5B:
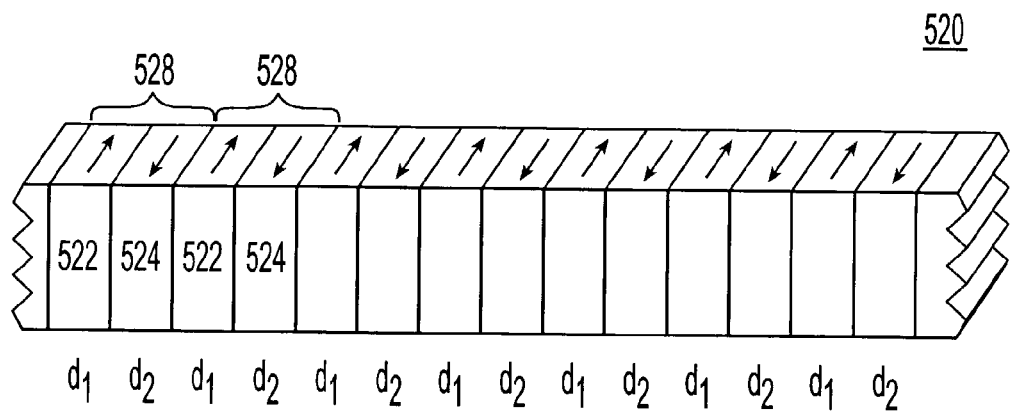

FIG. 5b shows an EOM crystal 520 having domains 522, 524 having width d1, d2, respectively. Domains 522 and 524 alternate along the propagation dimension and, in this instance d1=d2 and so the ratio of the width of the first domain to the second domain is 1 to 1. Each structural block 528 comprising a single pair of adjacent domains 522 and 524 is repeated along the propagation dimension and so the EOM crystal 520 is deemed to have a domain periodicity of P=2. And since the widths d1 and d2 of domains 522, 524, respectively, are equal, the EOM crystal is additionally said to have a duty cycle of 50%.

Figure 5C:
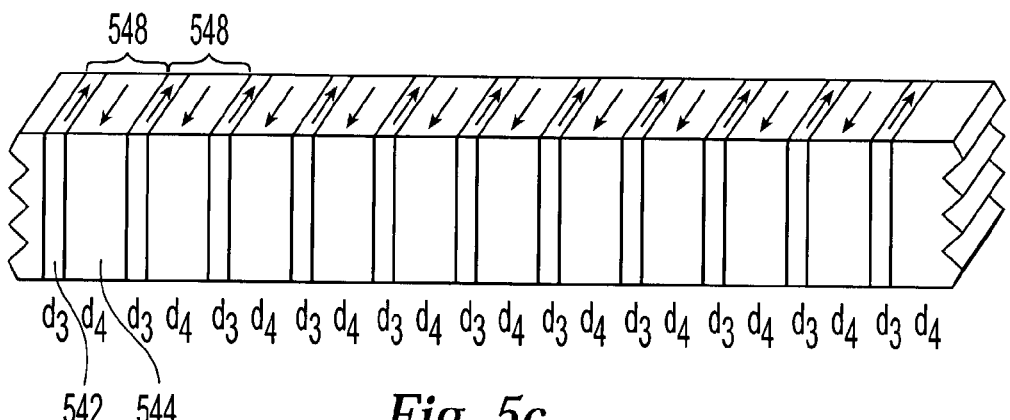

FIG. 5c shows an EOM crystal 540 having a plurality of structural blocks 548, each comprising domains 542, 544 (domain periodicity P=2) having widths d3, d4, respectively. The ratio of widths d3:d4 is 1:3 and so the EOM crystal 540 is considered to have a duty cycle of 25%. It is understood that widths d3 and d4 can take on some other relative values, giving a duty cycle of X=100×[d3/(d3+d4)] %.

Figure 5D:
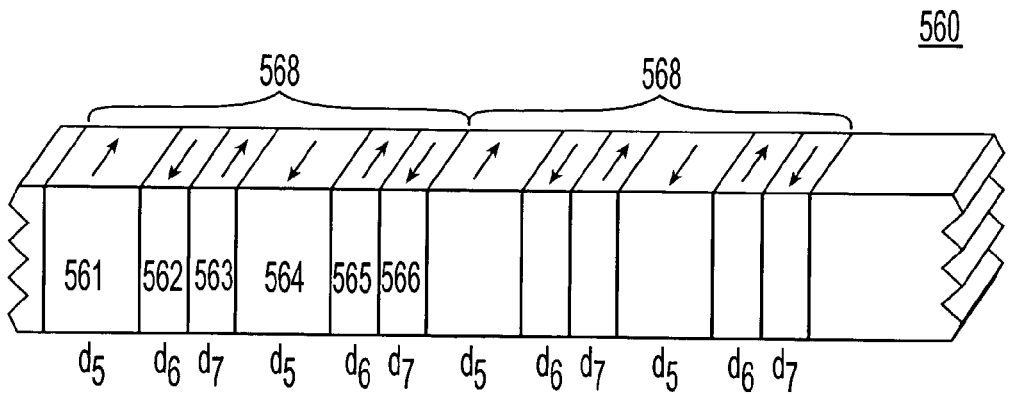

FIG. 5d shows an EOM crystal 560 having a plurality of structural blocks 568, each comprising a cycle of domains 561, 562, 563, 564, 565, 566 (domain periodicity P=6). Domains 561, 562 and 563 have widths d5, d6 and d7, respectively. Domains 564, 565, 566 also have widths d5, d6 and d7, respectively. However, domains 561 and 564 have opposite polarities. Similarly, domains 562 and 565 have opposite polarities, and so do domains 563 and 566. In a preferred embodiment, d6=d7 and in such case the EOM crystal 560 has domains of one of two widths. It is understood, however, that d5, d6 and d7 may take on other relative widths.

While the embodiments of FIGS. 5a-5d show specific examples of domain periodicities of (P=2 and P=6), it is understood that EOM crystals having other domain periodicities of P=4, 8 and even higher values, may be formed. In general, the number of periodicities and relative widths that is desired is dictated by the required phase matching condition which in turn determines the desired output spectrum of the final output signal from the light source.

Signal Generator Analysis

The signal generator 416 in the present invention drives the modulator crystal 410 that preferably is at a pump power level below lasing threshold. And, as stated above, the modulation signal comprises at least one fundamental frequency. This fundamental frequency thus becomes the spacing $\Omega$ between the comb frequencies in the output signal. Qualitatively, with application of only the fundamental frequency, the power of the primary injected wavelength has to go through (n-1) steps of a frequency ladder to contribute to the intensity in the n-th side band. This results in steep decrease of the power in the comb side bands away from the primary injected frequency.

In a preferred embodiment, therefore, the signal generator also outputs one, two or more harmonics of the fundamental frequency. Applying harmonics of the comb spacing empowers the corresponding side band directly, while shortening the way to other ones. Thus, through control of the exciting harmonic frequencies and determination of their powers and relative phases, the difference in intensities among the comb frequencies may be decreased. This can be shown analytically to be the case:

In the following description, a plurality of modulation frequencies is contemplated, the $i^{th}$ modulation frequency being designated by $\Omega_i$. The RF wave can be represented as a sum of sine waves with frequencies $\Omega_1 \ldots \Omega_m$:

$$E_{RF} = \frac{1}{2i} \sum_{\Omega=0}^{\Omega_m} E_\Omega \exp\{i[\Omega t - k_{RF}(\Omega)z]\} - (complex conjugate) \quad (1)$$

RF modulation causes the side harmonics in spectrum of optical wave E(z,t):

$$E(z,t) = \frac{1}{2} \sum_{N=-\infty}^{\infty} \sum_{\Omega=0}^{\Omega_m} E_N(z) \exp\{[(\omega + N\Omega)t - k(\omega + N\Omega)z]\} + c.c. \quad (2)$$

where $k(\omega)=n(\omega)\omega/c$; $n(\omega)$ being the refractive index of the waveguide at frequency $\omega$.

Numerical simulations based on Eq. (2) for the laser frequency of 193 THz and a first modulation frequency of 6.25 GHz and a second modulation frequency of 12.5 GHz indicate that an evenness to about 3 dB can be achieved across 16 generated teeth by applying the following voltages:

amplitude of first harmonic=0.5 V amplitude of second harmonic=3.17 V phase of second harmonic relative to first harmonic=28.6 degrees.

Periodic Crystal Structure

When the modulation frequency exceeds the cut-off frequency of electro-optical modulation, efficient modulation can no longer be performed. This is because high-speed modulation of an optical wave is limited due to the velocity mismatch between the electrical wave and optical wave. One way to obtain efficient modulation at high modulation frequencies is to fabricate the EO modulator on a substrate having a periodically poled structure. Such an approach is disclosed in H. Murata et al., Optical Pulse Generation By Electro-Modulation Method And Its Application To Integrated Ultrashort Pulse Generators, IEEE Journal on Selected Topics in Quantum Electronics, 2000, v.6, no.4, 1325-1331. The analytical basis behind this principle is now described.

Given a single modulation frequency $\Omega$ applied to an EO modulator, the applied voltage actually seen by the optical wave is given by:

$$U(z,t) = U_0 \sin(k_{RF}\alpha z - \Omega t) \quad (3)$$

where $\alpha = 1 - v_{RF}/v_0 = 1 - n_0/n_{RF}$ $v_{RF} = c/n_{RF}$ is the velocity of the RF wave, c is the velocity of light in a vacuum, $n_{RF}$ is the refractive index of the waveguide at the drive frequency, $v_0 = c/n_0$ is the velocity of optical wave, and $k_{RF}$ is the wave vector of the RF wave.

Therefore after transmitting over a distance $\Lambda$ equal to $$\Lambda = \frac{\lambda_{RF}}{|n_{RF} - n_0|} \quad (4)$$

the optical wave travels over a whole period of a sinusoidal drive signal. In such case no modulation can be realized because the EO-induced phase shift changes from positive to negative periodically with the period Λ, thus canceling the accumulated optical phase shift.

When the interaction length is Λ/2, the phase modulation reaches its maximum. As disclosed in Y. Lu et al. Applied Physics Letters, 2001 v.78, no.8, pp.1035-1037, the higher the modulation frequency, the smaller the distance Λ/2 that the effective interaction is available. For coplanar strip electrodes on a single domain lithium niobate crystal, the 3 dB modulation bandwidth is only 9.6 GHz·cm. To modulate the optical wave with frequencies 10 GHz or higher, one may modify the EO substrate to prevent the periodic cancellation of phase modulation and to force the phase shift to increase accumulatively along the distance.

One such modification is to introduce a periodic structure in the medium under modulation. In the present invention, this is performed by providing periodically poled LiNbO$_3$ (PPLN) domains. The signs of the induced EO phase shift are different in different domains with opposite poling. As the result, the optical wave will have a phase shift of π when passing through the domain boundary. If the domain length is chosen to be equal to Λ/2, permanent phase shift accumulation occurs. This approach is termed Quasi-Velocity-matching (QVM).

For EO modulation, the 1.55 μm light in a Z-cut PPLN waveguide at 50 GHz, the period of PPLN structure is 2.88 mm and given a 50% duty cycle, each domain's width is approximately Λ/2=1.44 mm, as presented in Y. Lu et al.

In one aspect, the present invention employs a plurality of modulation frequencies. Given M modulation frequencies $\Omega_1, \Omega_2, \ldots, \Omega_M$, M≥2, applied by a signal generator to an EO modulator, the quasi-velocity matching conditions should be matched for each of the M frequencies. The QVM conditions for M modulation frequencies can be modeled in a manner not unlike that used for quasi-phase-matching conditions for second harmonic generation as disclosed in M. Fejer et al., "Quasi-Phase-Matched Second Harmonic Generation: Tuning and Tolerances", IEEE Journal of Quantum Electronics, 1992, v.28, no.1, p.2631-2654. However, unlike the Fejer article in which a velocity match between two different optical wavelengths is carried out, in the present invention, the periodic structure is created to equalize the velocities of the electrical and optical waves.

Figure 6A:
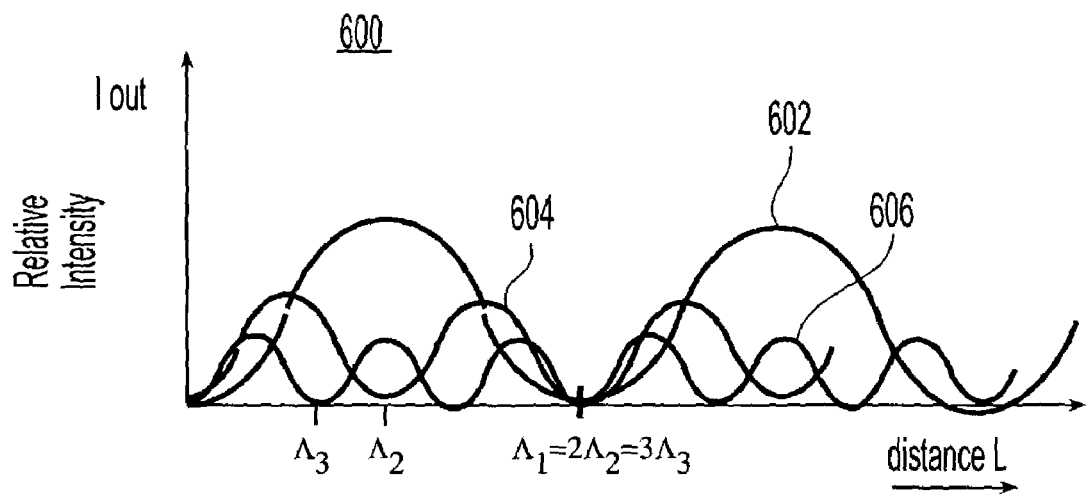
FIG. 6a shows the output signal from an EO crystal not having a periodically poled structure without quasi-velocity matching by a periodically poled structure.

FIG. 6a shows a plot 600 of signal intensity Iout as a function of distance L along an EO crystal that does not have a periodically poled structure (and so does not having quasi-velocity phase matching). In FIG. 6a, the signal curves 602, 604, 606 result from modulation with corresponding RF modulation frequencies Ω1, Ω2 and Ω3, where Ω1, Ω2 and Ω3 are above the cut-off frequency, Ω1=Ω2/2=Ω3/3, and the corresponding modulation lengths are $\Lambda_1$, $\Lambda_2$, $\Lambda_3$, respectively. As seen in this figure, there is no accumulation of signal energy (and so no gain in signal intensity) as the optical wave travels along the crystal. In this instance, the modulation is not at all efficient, since the EO-induced phase shift changes from positive to negative periodically with the period length of Λ, thus canceling the accumulated optical phase shift.

Figure 6B:
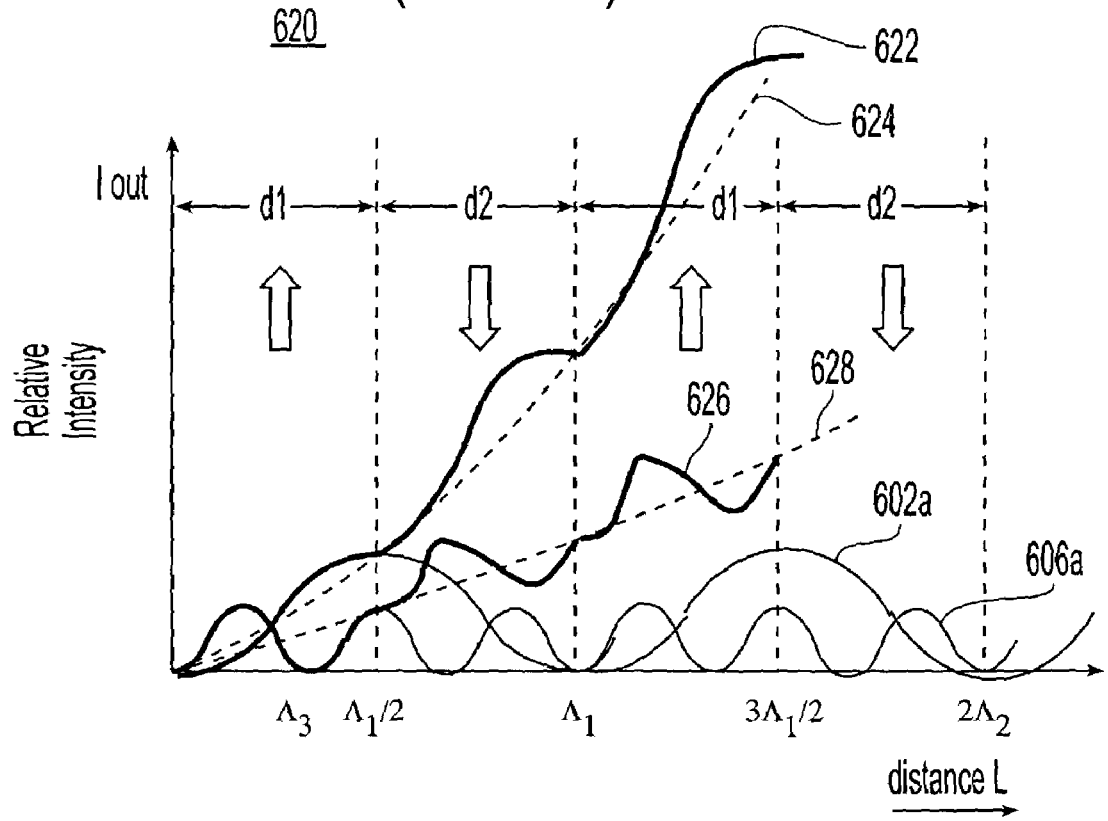
FIG. 6b shows quasi-velocity matching in EO modulation using the PPLN structure of FIG. 5b.

FIG. 6b shows a plot 620 of signal intensity Iout as a function of distance L along an EO crystal that has a periodically poled structure with a periodicity of P=2 in which the polarity of the domains is changed every $\Lambda_1/2$. In other words, plot 620 shows the results of using an EO crystal of the sort seen in FIG. 5a with the widths d1 and d2 of the first 522 and second 524 domains, respectively, being the same—a 50% duty cycle. In FIG. 6b, only modulation frequencies Ω1 and Ω3, with corresponding modulation lengths are $\Lambda_1$, $\Lambda_3$ are used with an EO crystal of the sort seen in FIG. 5a, with the additional caveat that d1=d2=$\Lambda_1$/2. Signal curve 622 shows the component output intensity for modulation frequency $\Omega_1$ overlayed on its calculated asymptotic function 624. Similarly, signal curve 626 shows the component output intensity for modulation frequency $\Omega_3$ overlayed on its calculated asymptotic function 628. The relative output intensities of curves 622, 626 can be compared to corresponding curves 602a, 606a, which are identical to curves 602, 606 in FIG. 6a. As one can see from FIG. 6b, efficient modulation can be realized for all odd harmonics (first, third, fifth, etc.) but there is no efficient modulation for even harmonics $\Omega_2$, $\Omega_4$, and others.

In a first preferred embodiment, an EO crystal having a periodicity P=2 with a PPLN structure having a duty cycle different from 50% is employed. By optimizing the duty cycle in PPLN structure of periodicity P=2, one can choose the optimal energy to be transferred to a particular side band in order to equalize and widen the output spectrum.

It can be shown that, in the general case, the intensity of the m-th harmonic in the output signal for a PPLN structure having a periodicity P=2 and a duty cycle X is given by:

$$I(\omega + \Omega) = I(\omega)\left(\frac{2}{m}\right)^2 \frac{I_{RF} \cdot z}{d_{eff}}\left(\frac{L \cdot r \cdot n^2}{\lambda}\right)\sin^2(\pi \cdot m \cdot X / 100) \quad (5)$$

where:

$d_{eff}$ is an effective distance between electrodes, n is a refractive index for the optical wave, z is the modulator impedance, r is electro-optical coefficient, λ and ω are wavelength and frequency of optical wave, respectively, and $I_{RF}$ is the intensity of modulation wave.

Figure 7:
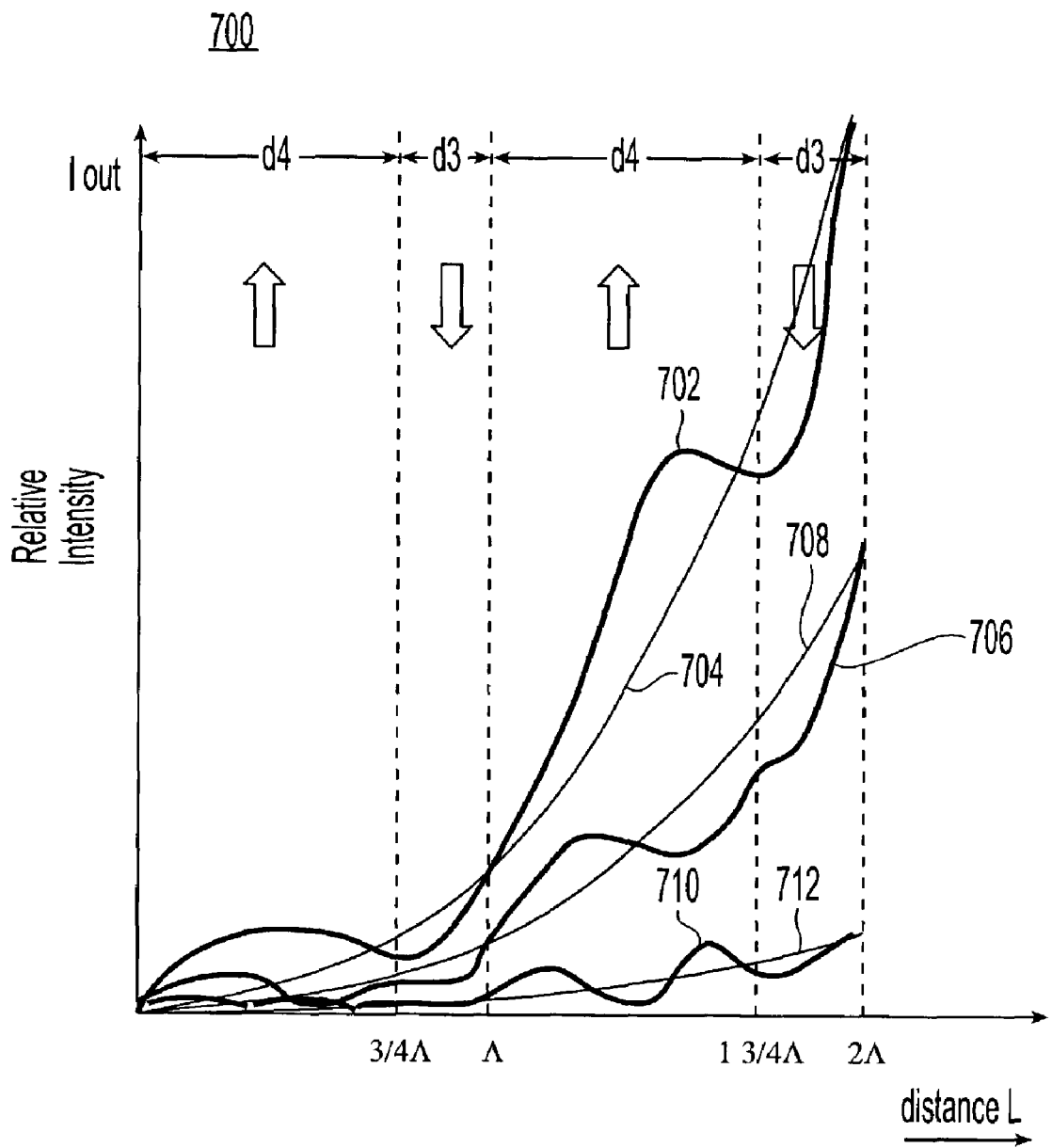
FIG. 7 shows quasi-velocity matching in EO modulation using the PPLN structure of FIG. 5c.

FIG. 7 shows a plot 700 of the output signal intensity for the first, second, and third modulation harmonics for an EO crystal with a periodicity of P=2 (alternating first and second widths) and a duty cycle of X=25% (first width being three times the second width). Thus, FIG. 7 is based on an EO crystal 540 of the sort depicted in FIG. 5c, where $d_3$=3 $d_4$. In FIG. 7, a total of M=3 RF modulation frequencies $\Omega_1$, $\Omega_2$ and $\Omega_3$ are used, with $\Omega_1$, $\Omega_2$ and $\Omega_3$ again being above the cut-off frequency, Ω1=Ω2/2=Ω3/3, and the corresponding modulation lengths being $\Lambda_1$, $\Lambda_2$, $\Lambda_3$, respectively.

In FIG. 7, the component output intensity curves 702, 706, 710 for modulation frequencies $\Omega_1$, $\Omega_2$ and $\Omega_3$, respectively, are overlayed on their calculated asymptotic functions 704, 708, 712, respectively. As seen in FIG. 7, the accurate solution for the component output intensity curves 702, 706, 710 vines around their corresponding asymptotic functions. The expressions for the asymptotic functions for modulation frequencies $\Omega_1$, $\Omega_2$ and $\Omega_3$ with Ω1=Ω2/2=Ω3/3 can be determined from Eq. (5) to reduce to:

$$I(\omega + \Omega_1) \sim \frac{1}{2} \cdot const \cdot L^2 \quad (6)$$

$$I(\omega + \Omega_2) \sim \frac{1}{4} \cdot const \cdot L^2$$

-continued $$I(\omega + \Omega_3) \sim \frac{1}{18} \cdot const \cdot L^2$$

One can see from the resultant asymptotic functions of Eq. (6) that the intensities of the first and second harmonics differ only by a factor of 2, so fairly efficient energy transfer into the second harmonic occurs. However, as also seen in these asymptotic functions, the intensity transfer from the input optical signal into the third harmonic is only one-ninth that of the intensity transfer into the first harmonic.

Applications for the Light Source

As discussed above, a light source in accordance with the present invention provides an output signal comprising, in the frequency domain, a comb of frequencies having substantially similar intensities. Such an output signal can find use in a number of applications.

One application is as a short pulse source to create a sequence of short pulses, such as solitons, used in, for example, a time-division multiplexed communication systems. In this regard, it is known that the interference of large number of monochromatic waves with equal intensities, equal phases, and equally spaced frequencies can result in the generation of narrow pulses of light (B. E. A. Saleh, M. C. Teich, Fundamentals of Photonics, 1991, John Wiley & Sons, Inc., p.76). The result of interference of M waves with intensities $I_0$ and phase difference $\phi=2\pi\Omega t$ is given by:

$$I(t) = I_0 \frac{\sin^2(M\pi t/T)}{\sin^2(\pi t/T)}$$

Figure 8:
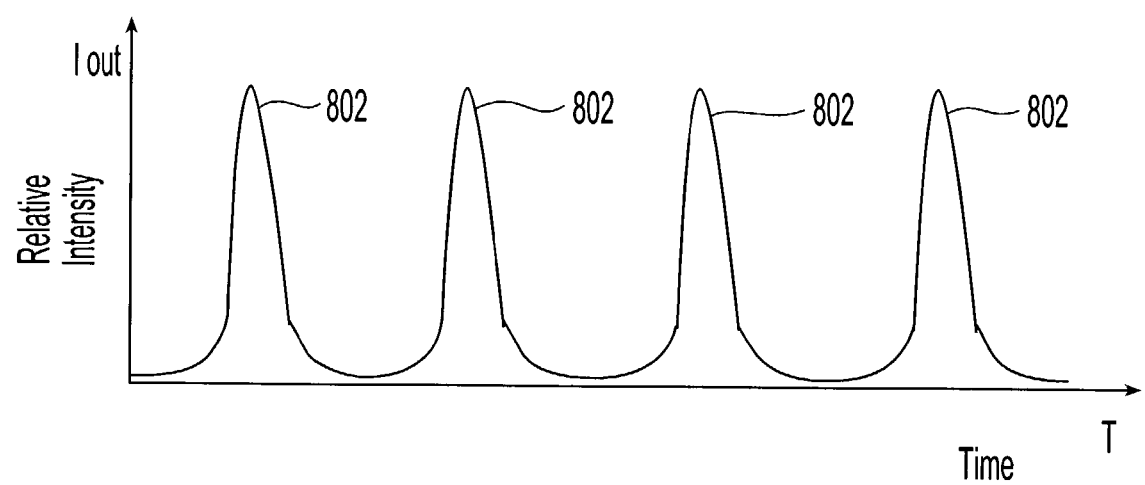
FIG. 8 shows a train of solitons that can be created by a device in accordance with the present invention.

The intensity I(t) is a periodic sequence of pulses with period $T=1/\Omega$, peak intensity $M^2 I_0$ and mean intensity $MI_0$. The width of each pulse is approximately T/M. For $\Omega=1$ GHz and M=1000, pulses of 1 picosecond width are generated. FIG. 8 illustrates a train of such pulses 802.

Another application is to provide a set of optical reference frequencies for various communication applications. For example, a series of tunable lasers can be locked onto such a comb that provides for stable generation of the tunable lasers at one of a number of predetermined precise optical frequencies. A similar purpose is proposed, for example, in O. P. Gough et al. "Zero frequency error DWDM channel synthesis using optical injection-locked comb line selection". Electronics Letters, 1999, v. 35, no.23, pp.2050-2052 for a fiber-based comb generator.

Yet another application is to employ the precise FSR provided by the comb generator described above. In order to amplify the output signals, a bank of slave lasers can be locked onto the lines of the comb. Such slave lasers may either be phase locked or injection locked. To prevent jitter, the comb itself may be locked by a master laser with stabilized frequency. Such an approach for comb generators for fiber optics is disclosed in C. F. Silva, A. J. Seeds and P. J. Williams "Terahertz span>60 channel exact frequency dense WDM source using comb generation and SG-DBR injection-locked laser filtering", IEEE Photonics Technology Letters, vol.13, pp.370-377 (2001).

Thus, a light source in accordance with the present invention may be employed in a wavelength division multiplexed (WDM) system, or in a time-division multiplexed (TDM) system to produce the optical signal(s) that are modulated and then transmitted.

Figure 9:
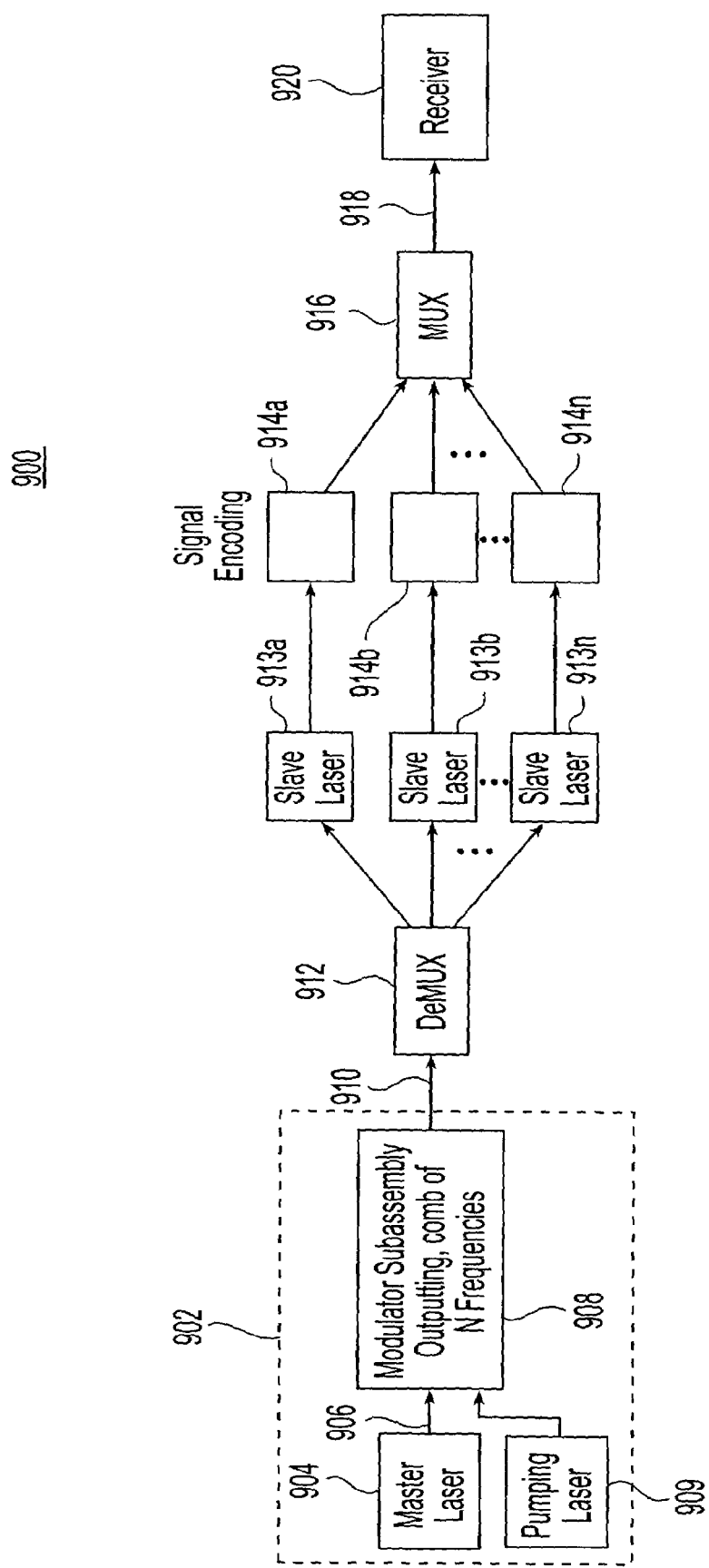
FIG. 9 shows a DWDM system employing a light source in accordance with the present invention.

FIG. 9 illustrates a WDM or TDM system 900 employing a light source 902 in accordance with the present invention. The light source 902 includes a master laser 904 that outputs a light signal 906 to a modulator subassembly 908, not unlike the subassembly 408, preferably having a chirped mirror structure. The signal output 910 of the light source 902 is a signal having a frequency comb of some number N spectral lines. The signal output 910 is input to a demultiplexer 912, or the like, to create the N individual spectral lines, each of which undergoes additional modulation and/or data encoding by encoding devices 914a, 914b, . . . 914n. The individual signal outputs from the encoding devices are subject to a multiplexer 916, or the like, in preparation for transmission over an optical channel 918 to a receiver 920. The receiver 920 may take the form of any of the receivers disclosed in U.S. patent application Ser. No. 10/087,022, filed Feb. 28, 2002 and entitled "System and Method for Orthogonal Frequency Division Multiplexed Optical Communication", whose contents are incorporated by reference to the extent necessary to understand the present invention.

While the present invention has been described with reference to one or more preferred embodiments, it should be kept in mind that variations from these are encompassed by the invention, whose scope is defined in the claims below.

What is claimed is:

1. A multi-frequency light source comprising:
    at least one laser configured to output a first light signal having a first frequency;
    an electro-optical modulator (EOM) comprising:
        a waveguide having a first and a second end, the waveguide extending along a light propagation dimension; and
        a signal generator configured to apply a modulation signal to drive the EOM;
    a first mirror positioned in an optical path between the at least one laser and the first end of the waveguide,
    a second mirror positioned at the second end of the waveguide; wherein the waveguide includes a plurality of alternately poled optical domains, each optical domain having a width defined along the light propagation dimension, the plurality of optical domains collectively having a periodic width structure, and
    wherein the first mirror comprises a first number of alternating layers formed from a first material having a first index of refraction, and a second material having a second index of refraction, wherein the first and second indices of refraction either greater or less than an index of refraction of the waveguide.

2. The multi-frequency light source according to claim 1, wherein the width of the optical domains is at least about 0.5 and is less than about 3 millimeters.

3. The multi-frequency light source according to claim 1 wherein the first mirror having reflectivity of at least 80%.

4. The multi-frequency light source according to claim 1, wherein each layer is between 0.3-0.6 microns in thickness.

5. The multi-frequency light source according to claim 1, wherein the layers formed from the first material have a first thickness and the layers formed from the second material have a second thickness, the first and second thicknesses being different from one another.

6. The multi-frequency light source according to claim 1, wherein widths of the alternating layers increase in a direction away from the first end of the waveguide.

7. The multi-frequency light source according to claim 1, wherein the second mirror comprises a second number of alternating layers formed from a first material having a first index of refraction, and a second material having a second index of refraction, wherein the first and second indices of refraction fall on either side of an index of refraction of the waveguide.

8. The multi-frequency light source according to claim 1, wherein the periodic width structure has a periodicity of two and the waveguide comprises domains having alternating first and second widths along he light propagation dimension.

9. The multi-frequency light source according to claim 8, wherein the first and second widths are the same size.

10. The multi-frequency light source according to claim 8, wherein the first and second widths are of different size.

11. The multi-frequency light source according to claim 10, wherein the first width is at least twice as large as the second width.

12. The multi-frequency light source according to claim 10, wherein the first width is at least three times as large as the second width.

13. The multi-frequency light source according to claim 1, wherein the periodic width structure has a periodicity of six, each period of six comprising two repeated blocks of three domains each, the three domains having first, second and third widths.

14. The multi-frequency light source according to claim 13, wherein the second and third widths are the same, and are dissimilar from the first width.

15. The multi-frequency light source according to claim 1, wherein the periodic width structure has a periodicity of a number N and the waveguide comprises repeated blocks of domains having first through $N^{th}$ widths which are all dissimilar to one another and wherein N>3.

16. The multi-frequency light source according to claim 1, wherein the modulation signal comprises multiple frequencies.

17. The multi-frequency light source according to claim 16, wherein the excitation signal comprises two frequencies, one of which is a multiple of the other.

18. The multi-frequency light source according to claim 16, wherein the modulation signal comprises three frequencies, two of which are multiples of a lowest of the three frequencies.

19. The multi-frequency light source according to claim 1, wherein the waveguide is formed by titanium doping a crystal.

20. The multi-frequency light source according to claim 19, wherein the titanium doped waveguide is doped with a gain medium.

21. The multi-frequency light source according to claim 20, wherein the gain medium comprises at least one from the group consisting of erbium and yttrium.

22. The multi-frequency light source of claim 1 comprising:
a signal generator configured to apply a modulation signal to drive the EOM; and
a duty cycle of the periodic structure being chosen to facilitate energy transfer to side harmonics of an output optical comb signal, and
wherein the modulation signal comprises at least a first component and a second of the modulation signal applied simultaneously to drive the EOM.

23. The multi-frequency light source of claim 22, wherein the waveguide is provided with a plurality of alternately poled optical domains having a periodic width structure, and a duty cycle other than 50%.

24. The multi-frequency light source of claim 23, wherein the modulation signal comprises at least three frequency components of the modulation signal, wherein all components are applied simultaneously to drive the EOM.

25. A wavelength division multiplexed optical communication system including a multi-frequency light source comprising:
at least one laser configured to output a first light signal having a first frequency;
an electro-optical modulator (EOM) comprising:
a waveguide having a first end and a second end, the waveguide extending between said first and second ends along a light propagation dimension;
a signal generator configured to apply a modulation signal to drive the EOM;
a first mirror positioned in an optical path between the at least one laser and the first end of the waveguide,
a second mirror positioned at the second end of the waveguide; wherein the waveguide is provided with a plurality of alternately poled optical domains, each optical domain having a width defined along the light propagation dimension, the plurality of optical domains collectively having a periodic width structure, and
wherein the first mirror comprises a first number of alternating layers formed from a first material having a first index of refraction, and a second material having a second index of refraction, wherein the first and second indices of refraction either greater or less than an index of refraction of the waveguide.

26. A time division multiplexed optical communication system including a multi-frequency light source comprising:
at least one laser configured to output a first light signal having a first frequency; an electro-optical modulator (EOM) comprising:
a waveguide having a first end and a second end, the waveguide extending between said first and second ends along a light propagation dimension; and
a signal generator configured to apply a modulation signal to drive the EOM;
a first mirror positioned in an optical path between the at least one laser and the first end of the waveguide,
a second mirror positioned at the second end of the waveguide; wherein the waveguide is provided with a plurality of alternately poled optical domains, each optical domain having a width defined along the light propagation dimension, the plurality of optical domains collectively having a periodic width structure, and
wherein the first mirror comprises a first number of alternating layers formed from a first material having a first index of refraction, and a second material having a second index of refraction, wherein the first and second indices of refraction either greater or less than an index of refraction of the waveguide.

27. A optical modulator sub-assembly comprising:
an electro-optical modulator (EOM) comprising:
a waveguide having a first end and a second end, the waveguide extending along a light propagation dimension between the first and second ends;
a signal generator configured to apply a modulation signal to drive the EOM;
a first mirror situated at the first end of the waveguide; and
a second mirror situated at the second end of the waveguide; wherein the waveguide is provided with a plurality of alternately poled optical domains having a periodic width structure, and a duty cycle other than 50%, and
wherein the first mirror comprises a first number of alternating layers formed from a first material having a first index of refraction, and a second material having a second index of refraction, wherein the first and second indices of refraction either greater or less than an index of refraction of the waveguide.

28. The optical modulator sub-assembly of claim 27, wherein the modulation signal is a multi-frequency modulation signal.

29. The optical modulator sub-assembly of claim 28, wherein the waveguide comprises a gain medium.

30. A optical device comprising:
a first and a second optical cavities, the first and second optical cavities having respective, different lengths;
a waveguide configured to receive light from a light source, wherein light received from the light source propagates along the waveguide; and
an electro-optical modulator (EOM) configured to subject light propagating along the waveguide to multi-frequency modulation, the multi-frequency modulation generating light having at least first and second different frequencies, wherein the first optical cavity is configured to support oscillation of light having the first frequency and the second optical cavity is configured to support oscillation of light having the second frequency, and
wherein a boundary of the first optical cavity is defined by a first layer of dielectric material and a boundary of the second optical cavity is defined by a second layer of different dielectric material, the first and second layers each having a respective different thickness.

31. The optical device of claim 30, wherein a boundary of the first optical cavity is defined by a first layer of dielectric material, having a first thickness of 0.3 to 0.6 micrometers, and a boundary of the second optical cavity is defined by a second layer of different dielectric material, the first and second layers each having a respective different thickness.

32. The optical device of claim 30, wherein an extent of the second cavity resides within the first cavity.

33. The optical device of claim 30, wherein first and second layers are layers of a chirped mirror.

34. The optical device of claim 30, wherein the waveguide is provided with a plurality of alternately poled optical domains having a periodic width structure, and a duty cycle other than 50%.

35. The optical device according to claim 30, wherein the waveguide is formed by titanium doping of a crystal.

36. The optical device according to claim 30, wherein the waveguide is doped with a gain medium.

37. The optical device according to claim 36, wherein the gain medium comprises at least one from the group consisting of erbium and yttrium.

38. The optical device according to claim 30, wherein the modulation signal comprises three frequencies, two of which are multiples of a lowest the of the three frequencies.

39. The optical modulator sub-assembly of claim 30, wherein the modulation signal is a multi-frequency signal, and the multi-frequency modulation signal comprises at least a first and a second modulation components having different frequencies applied simultaneously to the EOM.

40. The optical modulator sub-assembly according to claim 39, wherein the multi-frequency modulation signal consists of a first and a second modulation components having two frequencies, one of which is a multiple of the other, the first and the second modulation components being applied simultaneously to the OEM.

41. The optical modulator sub-assembly according to claim 39, wherein the multi-frequency modulation signal comprises three frequencies, two of which are multiples of a lowest the of the three frequencies.

42. The optical modulator sub-assembly according to claim 39, wherein the waveguide is formed by titanium doping of a crystal.

43. The multi-frequency light source according to claim 39, wherein the gain medium comprises at least one from the group consisting of erbium and yttrium.

44. The optical modulator sub-assembly of claim 39, wherein the waveguide is provided with a plurality of alternately poled optical domains having a periodic width structure, and a duty cycle other than 50%, the duty cycle being chosen to facilitate energy transfer to side harmonics of an output optical comb signal.

* * * * *